United States Patent
Dorner et al.

(10) Patent No.: US 9,514,543 B2
(45) Date of Patent: Dec. 6, 2016

(54) COLOR NAME GENERATION FROM IMAGES AND COLOR PALETTES

(71) Applicant: Amazon Technologies, Inc., Seattle, WA (US)

(72) Inventors: Charles Shearer Dorner, Seattle, WA (US); Robert Yuji Haitani, Seattle, WA (US); Gonzalo Alberto Ramos, Kirkland, WA (US); Paul Barnhart Sayre, III, Gig Harbor, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/316,560

(22) Filed: Jun. 26, 2014

(65) Prior Publication Data
US 2015/0379731 A1 Dec. 31, 2015

(51) Int. Cl.
*H04N 1/64* (2006.01)
*G06T 7/40* (2006.01)
(Continued)

(52) U.S. Cl.
CPC ............. *G06T 7/408* (2013.01); *G06K 9/4652* (2013.01); *G06Q 30/0276* (2013.01); *H04N 1/644* (2013.01); *G06T 2207/10024* (2013.01)

(58) Field of Classification Search
CPC .................... H04N 1/644; G06T 7/408; G06T 2207/10024; G06Q 30/0203
(Continued)

(56) References Cited

U.S. PATENT DOCUMENTS

| 5,508,718 A | 4/1996 | Haikin |
| 5,822,503 A | 10/1998 | Gass, Jr. et al. |

(Continued)

FOREIGN PATENT DOCUMENTS

| JP | 2012221317 A | * 11/2012 |
| WO | WO 2014/070914 A1 | 5/2014 |

(Continued)

OTHER PUBLICATIONS

Araki et al. (English translation of JP 2012221317 A).*
(Continued)

*Primary Examiner* — Yubin Hung
(74) *Attorney, Agent, or Firm* — Knobbe Martens Olson & Bear LLP

(57) ABSTRACT

Systems and methods are provided for generating color names for colors corresponding to images and/or palettes. A color image is obtained, and one or more color palettes corresponding to the color image are identified. The color palette may be generated based on palette generation criteria, which may facilitate or control a palette generation process. Illustratively, the palette generation process may include image pre-processing, color distribution generation, representative color identification, palette candidate generation, and palette determination. A color name for each color identified in the color palette and/or the color image can be identified based at least in part on color name popularity information. Color name popularity information may be identified from color name-related voting results provided by a social network site. Aspects of the disclosure are further directed to processing the identified color name(s), such as updating color name metadata associated with the original color image and/or the color palette.

20 Claims, 8 Drawing Sheets

(51) Int. Cl.
G06K 9/46 (2006.01)
G06Q 30/02 (2012.01)

(58) Field of Classification Search
USPC .................................. 382/162, 166; 345/601
See application file for complete search history.

(56) References Cited

U.S. PATENT DOCUMENTS

| | | | |
|---|---|---|---|
| 6,081,276 | A | 6/2000 | Delp |
| 6,124,945 | A | 9/2000 | Ishihara et al. |
| 6,385,336 | B1 | 5/2002 | Jin |
| 6,577,759 | B1 | 6/2003 | Caron et al. |
| 7,136,074 | B2 | 11/2006 | Hussie |
| 7,444,658 | B1* | 10/2008 | Matz et al. ............... 725/34 |
| 8,553,045 | B2 | 10/2013 | Skaff et al. |
| 8,576,241 | B1 | 11/2013 | Kanter et al. |
| 8,634,640 | B2 | 1/2014 | Bhatti et al. |
| 8,867,798 | B2* | 10/2014 | Shuster ............ G06F 17/30265 340/5.81 |
| 9,047,804 | B1 | 6/2015 | Moroney et al. |
| 9,135,719 | B1 | 9/2015 | Dorner et al. |
| 9,177,391 | B1 | 11/2015 | Dorner et al. |
| 9,245,350 | B1 | 1/2016 | Dorner et al. |
| 2001/0028464 | A1 | 10/2001 | Aritomi |
| 2002/0080153 | A1* | 6/2002 | Zhao et al. ............... 345/700 |
| 2003/0004938 | A1 | 1/2003 | Lawder |
| 2003/0011612 | A1* | 1/2003 | Luo et al. ............... 345/589 |
| 2005/0122427 | A1 | 6/2005 | Hougui et al. |
| 2005/0149411 | A1 | 7/2005 | Colwell |
| 2005/0222978 | A1 | 10/2005 | Drory et al. |
| 2006/0023082 | A1* | 2/2006 | Higuchi ............... 348/231.6 |
| 2006/0066629 | A1 | 3/2006 | Norlander et al. |
| 2006/0250669 | A1 | 11/2006 | Beretta |
| 2006/0268120 | A1 | 11/2006 | Funakura et al. |
| 2007/0100786 | A1 | 5/2007 | Moroney |
| 2008/0003547 | A1 | 1/2008 | Woolfe et al. |
| 2008/0025629 | A1* | 1/2008 | Obrador et al. ......... 382/256 |
| 2008/0046410 | A1 | 2/2008 | Lieb |
| 2008/0069442 | A1 | 3/2008 | Itoh |
| 2008/0301582 | A1 | 12/2008 | Gluck |
| 2008/0317336 | A1 | 12/2008 | Mojsilovic |
| 2009/0027414 | A1 | 1/2009 | Vaughn |
| 2009/0041345 | A1 | 2/2009 | Tirumalareddy et al. |
| 2009/0157595 | A1 | 6/2009 | Gubitz |
| 2009/0259567 | A1 | 10/2009 | Watts |
| 2010/0027834 | A1* | 2/2010 | Spitzig ............ G06K 9/00577 382/100 |
| 2010/0053201 | A1 | 3/2010 | Klassen et al. |
| 2010/0082654 | A1 | 4/2010 | Zhang et al. |
| 2011/0135195 | A1 | 6/2011 | Marchesotti et al. |
| 2011/0305386 | A1 | 12/2011 | Wang et al. |
| 2011/0319160 | A1 | 12/2011 | Arn et al. |
| 2012/0036163 | A1 | 2/2012 | Myers et al. |
| 2012/0045121 | A1* | 2/2012 | Youngman et al. ......... 382/162 |
| 2012/0099788 | A1 | 4/2012 | Bhatti et al. |
| 2012/0154420 | A1 | 6/2012 | Calandrino et al. |
| 2012/0163710 | A1 | 6/2012 | Skaff et al. |
| 2013/0033603 | A1* | 2/2013 | Suzuki et al. ............. 348/148 |
| 2013/0050238 | A1 | 2/2013 | Bergou et al. |
| 2013/0227636 | A1* | 8/2013 | Bettini et al. ............... 726/1 |
| 2013/0235398 | A1 | 9/2013 | Bhatti et al. |
| 2014/0037200 | A1 | 2/2014 | Phillips et al. |
| 2014/0044349 | A1 | 2/2014 | Wang et al. |
| 2014/0052584 | A1 | 2/2014 | Gershon et al. |
| 2014/0067014 | A1* | 3/2014 | Kaula et al. ............... 607/59 |
| 2014/0089781 | A1 | 3/2014 | Hoguet |
| 2014/0153821 | A1 | 6/2014 | Masuko et al. |
| 2014/0189476 | A1 | 7/2014 | Berthelot et al. |
| 2014/0355874 | A1 | 12/2014 | Sakamaki et al. |
| 2015/0235110 | A1* | 8/2015 | Curtis ............ G06K 9/00677 382/224 |
| 2015/0235389 | A1 | 8/2015 | Miller et al. |
| 2015/0262549 | A1 | 9/2015 | Moroney |
| 2015/0269747 | A1 | 9/2015 | Hogan et al. |
| 2015/0324392 | A1 | 11/2015 | Becker et al. |
| 2015/0378999 | A1 | 12/2015 | Dorner et al. |
| 2015/0379000 | A1 | 12/2015 | Haitani et al. |
| 2015/0379001 | A1 | 12/2015 | Gunningham et al. |
| 2015/0379002 | A1 | 12/2015 | Dorner et al. |
| 2015/0379003 | A1 | 12/2015 | Dorner et al. |
| 2015/0379004 | A1 | 12/2015 | Sayre et al. |
| 2015/0379005 | A1 | 12/2015 | Dorner et al. |
| 2015/0379006 | A1 | 12/2015 | Dorner et al. |
| 2015/0379071 | A1 | 12/2015 | Dorner et al. |
| 2015/0379608 | A1 | 12/2015 | Dorner et al. |
| 2015/0379732 | A1 | 12/2015 | Sayre et al. |
| 2015/0379733 | A1 | 12/2015 | Dorner et al. |
| 2015/0379738 | A1 | 12/2015 | Gunningham et al. |
| 2015/0379739 | A1 | 12/2015 | Dorner et al. |
| 2015/0379743 | A1 | 12/2015 | Dorner et al. |
| 2015/0379959 | A1 | 12/2015 | Dorner et al. |
| 2016/0005188 | A1 | 1/2016 | Dorner et al. |
| 2016/0005201 | A1 | 1/2016 | Kunkel et al. |
| 2016/0104303 | A1 | 4/2016 | Dorner et al. |

FOREIGN PATENT DOCUMENTS

| | | |
|---|---|---|
| WO | WO 2015/200502 A1 | 12/2015 |
| WO | WO 2015/200505 A1 | 12/2015 |
| WO | WO 2015/200509 A1 | 12/2015 |
| WO | WO 2015/200515 A1 | 12/2015 |
| WO | WO 2015/200523 A1 | 12/2015 |

OTHER PUBLICATIONS

Montagne et al. ("Adaptive color quantization using the baker's transformation," J. Electronic Imaging 15(2), Apr. 2006).*

Yu et al. ("Contextual algorithm for color quantization," J. Electronic Imaging 12(3), Jul. 2003).*

Luo et al. ("Novel color palettization scheme for preserving important colors," Proc. SPIE. 5008, Color Imaging VIII: Processing, Hardcopy, and Applications, Jan. 20, 2003).*

Dorner, C.S., Image-Based Color Palette Generation, U.S. Appl. No. 14/316,483, filed Jun. 26, 2014.

Dorner, C.S., Automatic Image-Based Recommendations Using a Color Palette, U.S. Appl. No. 14/316,268, filed Jun. 26, 2014.

Bell, E., Color Detection: Technology on Heels With Lyst Engineering, dated Feb. 22, 2014, retrieved Apr. 7, 2014, <http://developers.lyst.com/data/images/2014/02/22/color-detection/>.

Periasamy, P.S., et al., "A Common Palette Creation Algorithm for Multiple Images with Transparency Information," Procedeedings of the International Conference on Advances in Computing, Control, and Telecommunication Techologies, IEEE 2009.

"Exalead CloudView Semantics Whitepaper," Doc. No. EN.140.001.0-V1.2; Oct. 2010, pp. 1-30. Retrieved from http:www.3ds.com/fileadmin/PRODUCTS/EXALEAD/Documents/whitepapers/Exalead-CloudView-Semantics-EN.pdf on Aug. 24, 2015.

Beretta, Giordano B., et al.; "Harmonious colors: from alchemy to science," Color Imaging XVII: Displaying Processing, Hardcopy, and Applications, SPIE vol. 8292, No. 1, pp. 1-7; Bellingham, WA; Jan. 22, 2012.

Csurka, Gabriela, et al.; "Learning moods and emotions from color combinations," Proceedings of the Seventh Indian Conference on Computer Vision, Graphics and Image Processing, pp. 298-305; New York; Dec. 12, 2010.

Global Color Survey, http://www.colorcom.com/global-color-survey, Feb. 1, 2001, accessed Sep. 11, 2015.

Heer, Jeffrey, et al.; "Color naming models for color selection, image editing and palette design," Proceedings of the 2012 ACM Annual Conference on Human Factors in Computing Systems, pp. 1007-1016; New York; May 5, 2012.

Lawder, Jonathan, "The Application of Space-filling Curves to the Storage and Retrieval of Multi-dimensional Data," PhD thesis; Sections 4.3.5.1, p. 68, and 6.5, pp. 121-130; Jan. 1, 2000.

Tremeau et al., "A vector quantization algorithm based on the nearest neighbor of the furthest color," Proceedings of International Conference on Image Processing, vol. 3, pp. 682-685, Oct. 26-29, 1997.

(56) References Cited

OTHER PUBLICATIONS

Tropf, H. et al., "Multidimensional range search in dynamically balanced trees," Angewandte Informatik (Applied Informatics), pp. 71-77; Braunschweig, Germany; Feb. 1, 1981.
Zhu, Haiping, et al., "Deep into Color Names: Matching Color Descriptions by Their Fuzzy Semantics," Artificial Intelligence: Methodology, Systems, and Applications Lecture Notes in Computer Science; Lecture Notes in Artificial Intelligence, pp. 138-149; Jan. 1, 2006.
International Search Report and Written Opinion in PCT/US2015/037469 mailed on Oct. 1, 2015.
International Search Report and Written Opinion in PCT/US2015/037456 mailed on Sep. 9, 2015.
International Search Report and Written Opinion in PCT/US2015/037494 mailed on Sep. 14, 2015.
International Search Report and Written Opinion in PCT/US2015/037465 mailed on Oct. 27, 2015.
International Search Report and Written Opinion in PCT/US2015/037481 mailed on Sep. 14, 2015.
Das, et al., Indexing flowers by color names using domain knowledge-driven segmentation, Proc. the Fourth IEEE Workshop on Applications of Computer Vision; pp. 94-99; 1998.
Wang, et al., Contextual Dominant Color Name Extraction for Web Image Search, 2012 IEEE International Conference on Multimedia and Expo Workshops (ICMEW), pp. 319-324.
"Color Blind Assistant." iPhone Apps Versions 2.61 and 2.62; Release date Oct. 14-15, 2009; pp. 1-7.
"Color Name & Hue." Wayback Machine Archive; May 16, 2013; pp. 1-17. <http://web.archive.org/web/20130516202647/http://www.color-blindness.com/color-name-hue>.
"HTML Color Picker," Wayback Machine Archive; Feb. 15, 2013; 1 page. <http://web.archive.org/web/20130215181242/http://imagecolorpicker.com/>.
"Tin Eye Labs." Wayback Machine Archive; Sep. 20, 2012; pp. 1-3. <http://web.archive.org/web/20120920051712/http://labs.tineye.com/color/>.
Delon, J., et al., Automatic Color Palette, Proceedings of the International Conference on Image Processing, vol. 2, Sep. 11-14, 2005, pp. 706-709.
Nickerson, D., et al., Central Notations for ISCC-NBS Color Names, Journal of the Optical Society of America, vol. 31; pp. 587-591; Sep. 1941.

\* cited by examiner

COLOR NAME GENERATION FROM IMAGES AND COLOR PALETTES

BACKGROUND

In many computing-centric commerce models, consumers are able to efficiently view and purchase a wide variety of items (e.g., goods and/or services) over computer networks. In many scenarios, a particular network resource, such as a commerce network site, can present items associated with various colors or color schemes. Often, individual sellers can provide color-related information about the item for sale, such as one or more color images depicting the item, as well as corresponding color names or color scheme names.

BRIEF DESCRIPTION OF THE DRAWINGS

The foregoing aspects and many of the attendant advantages will become more readily appreciated as the same become better understood by reference to the following detailed description, when taken in conjunction with the accompanying drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
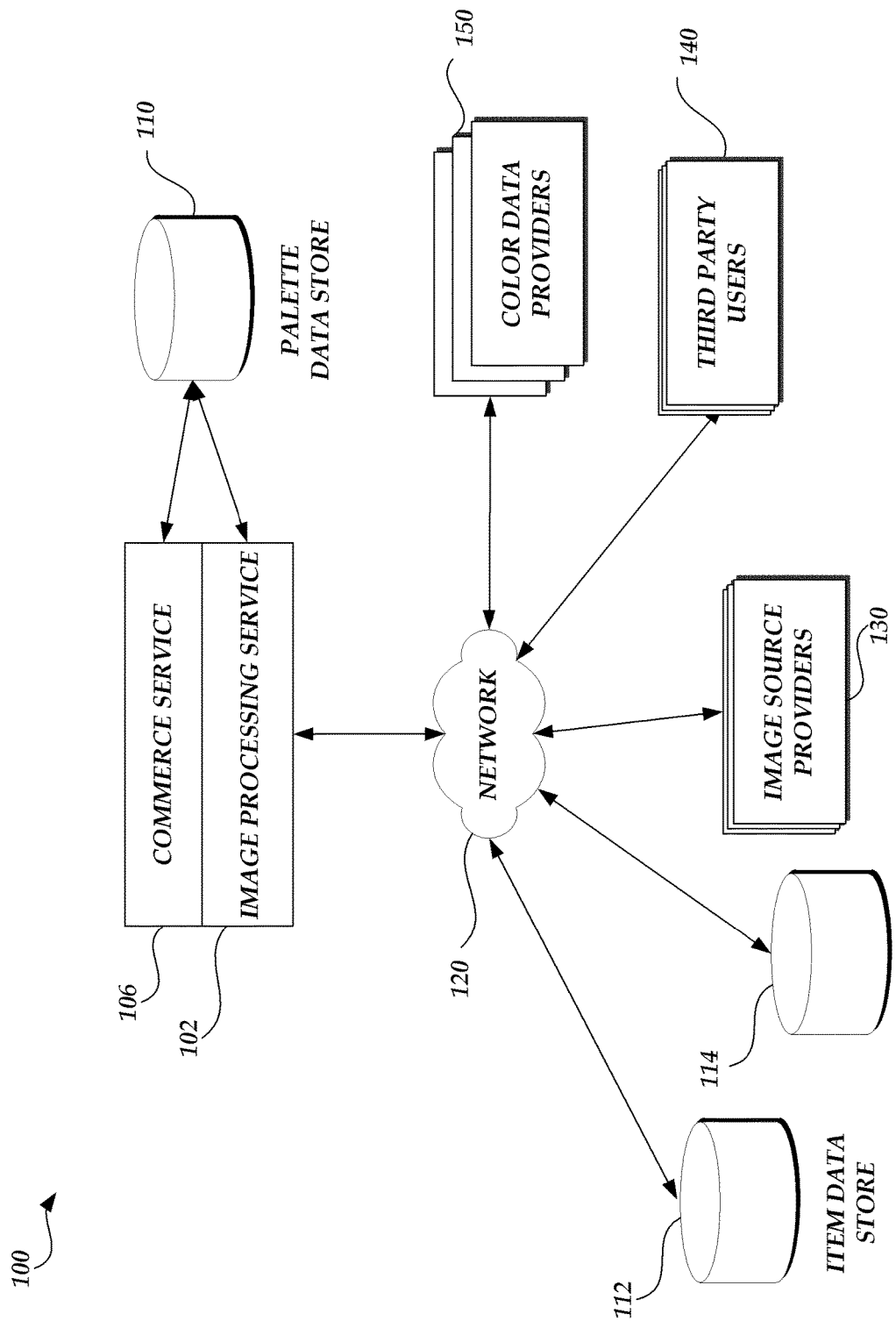
FIG. 1 is a block diagram illustrating one embodiment of an operating environment including an image processing service for palette generation based on color images and for color name generation based on color images and color palettes.

Generally described, the present disclosure corresponds to methods and systems for color image and/or color palette processing. In many occasions, the host of a commerce or other network or site, a merchandise provider or vendor utilizing the site, or a consumer visiting the site may wish to extract representative colors from color images to facilitate sales of items associated with various colors. For example, color matching items can be promoted for sale. Aspects of the present disclosure relate to generating color palettes, which are collections of representative colors each optionally associated with weight or other metadata, based on color images. Various factors can facilitate the generation of color palettes, for example, color standardization or binning, color distance formulae, popularity of colors or color palettes among a group of users, color identification algorithms, subjects depicted by color images or other related metadata.

In accordance with an illustrative embodiment, an image processing service obtains a color image depicting one or more items, a design, a scene, or the like, and generates one or more palettes based on palette generation criteria. The palette generation criteria can be input by a consumer, a host of a commerce or other network site, a merchandise provider or vendor, a designer, an artist, or the like. Alternatively, or in addition, the palette generation criteria can be automatically generated by a computing device or system. The palette generation criteria may indicate various preferences, factors, parameters, thresholds, or requirements that facilitate or control a palette generation process.

Illustratively, the palette generation process may include various elements such as image pre-processing, color distribution generation, representative color identification, palette candidate generation, and palette determination. For example, the color image can be pre-processed prior to the generation of a color distribution or identification of representative colors. The pre-processing can include de-noising, normalization, down sampling, area-marking, or the like. Illustratively, a color distribution can be generated based on color values corresponding to each pixel of the color image. Color standardization or binning can facilitate the generation of color distribution. Representative colors can then be identified based on the color distribution. For example, colors that are most distant from one another as measured by certain color distance formula can be identified as representative colors. As another example, representative colors can be identified by taking into account color popularity information provided by third parties, such as color-related voting results provided by a social network site. One or more thresholds can be utilized in the identification of representative colors to facilitate color merging or weighting. A selection of the identified representative colors with associated weight or other metadata may constitute a palette candidate corresponding to specific threshold settings as indicated by palette generation criteria. In some embodiments, multiple palette candidates can be generated by changing the threshold settings. Eventually, a palette can be determined by examining one or more palette candidates. This determination can be achieved manually, for example, based on user preference or by user voting. This determination can also be achieved automatically as an optimization of a function between certain attributes of palette candidates and their corresponding settings of palette generation criteria.

Additional aspects of the present disclosure relate to generating color names for colors corresponding to images and/or palettes. Yet further aspects relate to generation of a searchable color name database. Other aspects relate to identifying missing color names from images and/or color palettes and supplementing metadata associated with the images and/or color palettes with the missing color names. Still further aspects relate to validating color names provided as part of a user search query or as originally associated with an image and/or a color palette with preferred color names for colors in the corresponding image and/or palette. In one embodiment, color names can be identified, at least in part, by taking into account color name popularity information, which in some instances can be provided by third parties, such as color name-related voting results provided by a social network site.

Overview of an Example Embodiment

FIG. 1 illustrates an embodiment of an image processing environment 100 that can implement the features described herein in the context of an example image processing service 102. In some embodiments, the image processing environment 100 includes the image processing service 102, a commerce service 106, a palette data store 110, an item data store 112, a color name data store 114, a network 120, image source providers 130, third party users 140, and color data providers 150. In some embodiments, various components of the image processing environment 100 are communicatively interconnected with one another via the network 120. The image processing environment 100 may include different components, a greater or fewer number of components, and can be structured differently. For example, there can be more than one data store or other computing devices in connection with the image processing service 102. As another example, components of the image processing environment 100 may communicate with one another with or without the network 120.

The image processing service 102 can correspond to any system capable of performing the associated processes described herein. The image processing service 102 may be implemented by one or more computing devices. For example, the image processing service 102 may be implemented by computing devices that include one or more processors to execute one or more instructions, memory, and communication devices to transmit and receive data over the network 120. In some embodiments, the image processing service 102 is implemented on one or more backend servers capable of communicating over a network. In other embodiments, the image processing service 102 is implemented by one or more virtual machines in a hosted computing environment (e.g., a "cloud computing environment"). The hosted computing environment may include one or more provisioned and released computing resources, which computing resources may include computing, networking or storage devices.

In one aspect, the image processing service 102 can correspond to one or more applications that perform, individually or in combination, the image processing functions described herein, including image pre-processing, color distribution generation, representative color identification, palette candidate generation, palette determination, color name determination based at least in part on color name popularity information, generation of a searchable color name database, validation of color names associated with an image and/or a color palette, etc. In other aspects, the image processing service 102 may be configured to store or update palettes at the palette data store 110 or color names at the color name data store 114. In some embodiments, the image processing service 102 is associated with a network or network-based merchandise provider or vendor. The image processing service 102 may access and process images from the item data store 112, provided by merchandisers or other parties for posting on a network site, for example on a network page (e.g., a Web page) presenting details regarding a particular item(s) (an "item detail page") and from which consumers can purchase the item. In yet other embodiments, the images are provided by consumers, provided by third party image data stores, or provided by other image sources.

The image processing service 102 may be communicatively connected to the palette data store 110. The palette data store 110 can generally include any repository, database, or information storage system that can store palette data and associated metadata. The palette data stored in the palette data store 110 can be collections of colors, including collections of colors generated by a user and/or system based at least in part on human color preferences, optionally with associated weight(s) and dates of creation(s). Palette data can be of various formats, such as lists, vectors, arrays, matrices, etc. Metadata can be associated with individual palettes, for purposes of indicating their format, tags, associations, sources, popularity, date(s)/time(s) of creation/editing, geolocation data, last update time, semantics, features, conditions, associated demographics (e.g., geographical region, age, gender, ethnic group, religion, culture, language, dialect, etc. of users that provided input used in creating the palette), or the like. For example, metadata can link a palette to a corresponding color image from which the palette is derived. Alternatively, or in addition, metadata may indicate a category or a position in a taxonomy associated with the corresponding color image. As another example, metadata may indicate patterns, colocations, or other attributes of spatial distribution of palette colors within the corresponding color image. Illustratively, metadata may indicate whether palette colors appear adjacent to one another, whether palette colors are displayed in a scattered or concentrated form, whether the locations of areas showing palette colors are correlated, or the like. The color palettes may have been ranked or voted on by people to indicate which combinations of colors are more preferable, visually appealing, popular, or the like. Such ranking and/or votes may be stored and may be used to weight color palettes.

The commerce service 106 may provide an electronic catalog to which third party users 140 may be provided access via respective user devices. For example, the commerce service 106 may provide network pages that each provides relevant details regarding a particular item(s) ("item detail pages"). A given item detail page may include detailed information regarding an item (e.g., an item being offered for sale), such as one or more images, descriptive text, color name(s), a price, weight, size options, reviews of the item by other users or by professional reviewers, alternative similar items, and/or other information. The item detail page may also include controls via which the user can select among various versions of the item (e.g., size, color, etc.), and a purchase control via which the user can initiate purchase of the item (e.g., by adding the item to a shopping cart). The commerce service 106 may also provide third party users 140 with interfaces via which the user can request recommendations and submit queries, such as color-related recommendations and search queries.

While a commerce environment is often used as an example herein, it will be appreciated that the image processing service 102, as disclosed herein, may be used in a variety of environments other than a commerce environment. For example, aspects of the present disclosure, in some embodiments, may be used and/or implemented to efficiently name colors, affiliated colors and color palettes for consumers, merchandisers, designers, architects, artists, landscapers, developers, gamers, students, etc. for virtually any purpose. Without limitation, aspects of the present disclosure may be used for efficient generation of color names for use in social networking contexts, digital photo albums, digital news articles, artistic works, content generation, design/architectural drawings, etc., just to name a few practical, non-limiting examples.

The network 120 may include any suitable combination of networking hardware and protocols necessary to establish communications within the image processing environment 100. For example, the network 120 may include private networks such as local area networks (LANs) or wide area networks (WANs) as well as public or private wireless networks, satellite networks, cable networks, cellular networks, or the Internet. In such an embodiment, the network 120 may include hardware (e.g., modems, routers, switches, load balancers, proxy servers, etc.) and software (e.g., protocol stacks, accounting software, firewall/security software, etc.) that establishes networking links within the image processing environment 100. Additionally, the network 120 may implement one of various communication protocols for transmitting data between components of the image processing environment 100.

The image processing service 102 may be further communicatively connected to the item data store 112. The item data store 112 may be associated with one or more network sites and systems, such as a commerce network site providing the commerce service 106 and the image processing service 102, and/or third party merchandise providers or vendors that may market items via the commerce service 106. The item data store 112 may be associated with any computing device(s) that can facilitate communication with the image processing service 102 via the network 120. Such computing devices can generally include servers, desktops, laptops, wireless mobile devices (e.g., smart phones, PDAs, tablets, wearable computing devices, or the like), game platforms or consoles, electronic book readers, television set-top boxes, televisions (e.g., internet TVs), and computerized appliances, to name a few. Further, such computing devices can implement any type of software (such as a browser or a mobile media application) that can facilitate the communications described above.

The item data store 112 may have metadata/keywords that identify and/or describe the respective items. By way of example, the item data 112 may store item records for respective items in one or more electronic catalogs including unique item identifiers, such as Universal Product Codes (UPC), European Article Numbers (EAN), International Standard Book Numbers (ISBN), and/or other identifiers. By way of further example, the item metadata may indicate the item type and/or category, such as "dress" and "clothing," or "blender" and "kitchen appliance." In addition, the item metadata may include text or another identifier (sometimes referred to herein as a "color name") identifying one or more colors of the item or of versions of the item, such as "red," "orange," "blue," etc. The metadata may further include such information as brand. Other data, such as price, may be included as metadata or otherwise made accessible. Still further, a given item record may include one or more images of the item, where the image may be associated with metadata (e.g., identifying items in the image by item type, item category, unique identifier, identifying associated color palettes, identifying associated color names, etc.). Certain keywords may not identify a color explicitly, but may be suggestive of a color (e.g., "summery," "formal," "wintery," etc.). Item record data may have been provided by an operator of a commerce or other network site, by consumers, merchandisers, vendors, third party data stores, artists, designers, color providers, and/or other sources. As used herein, the term "item," in addition to having its ordinary meaning, is used interchangeably to refer to an item itself (e.g., a particular product) and to its description or representation in a computer system or electronic catalog. As will be apparent from the context in which it is used, the term is also sometimes used herein to refer only to the item itself or only to its representation in the computer system.

Yet further, the image processing service 102 is communicatively connected to the color name store 114. The color name store 114 can generally include any repository, database, or information storage system that can store color name data and, in some embodiments, associated metadata. The color name store 114 may be associated with any computing device(s) that can facilitate communication with the image processing service 102 via the network 120. Such computing devices can generally include servers, desktops, laptops, wireless mobile devices (e.g., smart phones, PDAs, tablets, wearable computing devices, or the like), game platforms or consoles, electronic book readers, television set-top boxes, televisions (e.g., internet TVs), and computerized appliances, to name a few. Further, such computing devices can implement any type of software (such as a browser or a mobile media application) that can facilitate the communications described above.

The color name data stored in the color name store 114 can be collections of associations of color names with other color identifiers, as well as date(s) of creation or other metadata corresponding to the associations. Color name data can be of various formats, such as lists, vectors, arrays, matrices, etc. Metadata can be associated with individual color name associations for purposes of textually indicating color name(s) and associating these color name(s) with other color identifier(s), and optionally indicating their format, tags, associations, sources, popularity, date(s)/time(s) of creation/editing, geolocation data, last update time, semantics, features, conditions, associated demographics (e.g., geographical region, age, gender, ethnic group, religion, culture, language, dialect, etc. of users that provided input used in generating the color names), or the like.

The image source providers 130 may correspond to hosts of a commerce or other network site, merchandise providers or vendors, designers, photographers, artists, social network sites, or the like, and can be associated with any computing device(s) that can facilitate communication with the image processing service 102 via the network 120. Such computing devices can generally include wireless mobile devices (e.g., smart phones, PDAs, tablets, wearable computing devices, or the like), desktops, laptops, game platforms or consoles, electronic book readers, television set-top boxes, televisions (e.g., internet TVs), and computerized appliances, to name a few. Further, such computing devices can implement any type of software (such as a browser or a mobile media application) that can facilitate the communications described above.

Third party users 140 may correspond to visitors of a network site (e.g., a commerce network site providing commerce service 106), such as consumers, designers, architects, or the like, and can be associated with any computing device(s) that can facilitate communication with the image processing service 102 via the network 120. Such computing devices can generally include wireless mobile devices (e.g., smart phones, PDAs, tablets, wearable computing devices, or the like), desktops, laptops, game platforms or consoles, electronic book readers, television set-top boxes, televisions (e.g., internet TVs), and computerized appliances, to name a few. Further, such computing devices can implement any type of software (such as a browser or a mobile media application) that can facilitate the communications described above.

Color data providers 150 may correspond to hosts of databases and/or data stores of color palettes, color names, color surveys, or the like. Color palettes and/or color names may be ranked, rated, and/or voted on by a community of people associated with the color data providers 150. The various hosts can include, for example and without limitation, hosts of an artistic network site, electronic commerce site, merchandise providers or vendors, surveys of the general population, designers, photographers, artists, social network sites, or the like. In some embodiments, the various color data providers 150 are associated with a particular community of people such as artists, designers, photographers, cinematographers, fashion experts, critics, or the like. In certain embodiments, the color data providers 150 are accessible by the public in general such that the associated color palettes and/or color names are ranked, rated, or voted on by people that do not necessarily belong to any particular community or group.

Particular color data providers 150 may be associated with a particular community that includes a biased population. This may allow for the image processing service 102 to retrieve palettes and/or color names with a known and/or desired bias depending at least in part on the use of the retrieved palettes and/or color names. This may also allow for the image processing service 102 to reduce or remove the bias present in different communities by combining palettes and/or color names from a plurality of communities of users.

The color data providers 150 can be associated with any computing device(s) that can facilitate communication with the image processing service 102 via the network 120. Such computing devices can generally include wireless mobile devices (e.g., smart phones, PDAs, tablets, wearable computing devices, or the like), desktops, laptops, game platforms or consoles, electronic book readers, television set-top boxes, televisions (e.g., internet TVs), and computerized appliances, to name a few. Further, such computing devices can implement any type of software (such as a browser or a mobile media application) that can facilitate the communications described above.

One skilled in the relevant art will appreciate that the example components and configurations provided in FIG. 1 are illustrative in nature. Accordingly, additional or alternative components and/or configurations, especially regarding the additional components, systems and subsystems for facilitating functions disclosed herein may be utilized.

Figure 2:
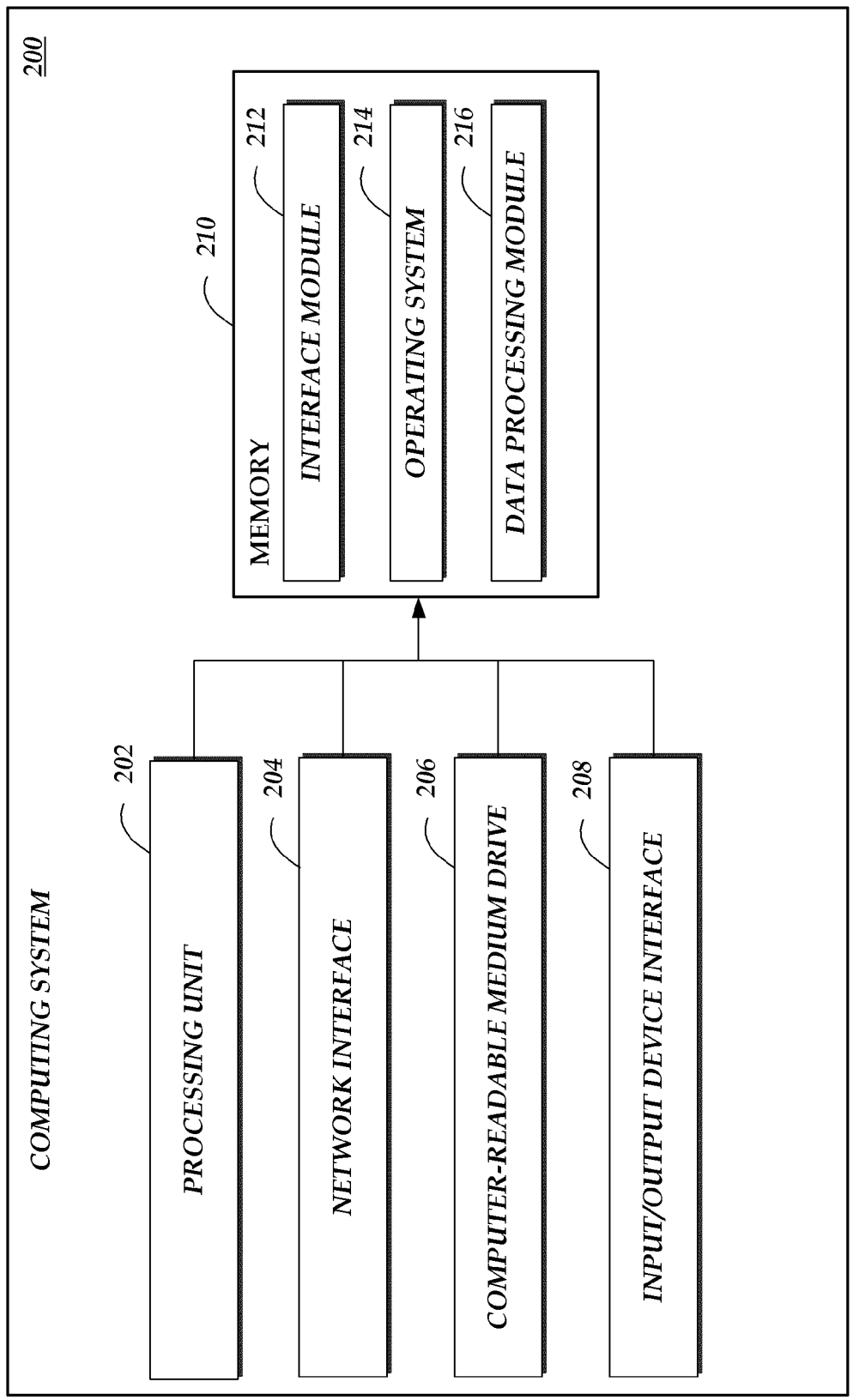
FIG. 2 is a block diagram illustrating an embodiment of example components of computing system capable of providing the image processing service utilized in accordance with the operating environment of FIG. 1.

FIG. 2 is a block diagram illustrating an embodiment of example components of a computing system 200 capable of implementing an image processing service 102 utilized in accordance with the image processing environment 100 of FIG. 1. The example computing system 200 includes an arrangement of computer hardware and software components that may be used to implement aspects of the present disclosure. Those skilled in the art will appreciate that the computing system 200 may include more (or fewer) components than those depicted in FIG. 2. It is not necessary, however, that all of these generally conventional components be shown in order to provide an enabling disclosure.

The computing system 200 may include a processing unit 202, a network interface 204, a non-transitory computer-readable medium drive 206, and an input/output device interface 208, all of which may communicate with one another by way of a communication bus. The network interface 204 may provide the image processing service 102 with connectivity to one or more networks or computing systems. The processing unit 202 may thus receive information and instructions from other computing devices, systems, or services via a network. The processing unit 202 may also communicate to and from memory 210 and further provide output information via the input/output device interface 208. The input/output device interface 208 may also accept input from various input devices, such as a keyboard, mouse, digital pen, touch screen, etc.

The memory 210 may contain computer program instructions that the processing unit 202 may execute in order to implement one or more embodiments of the present disclosure. The memory 210 generally includes RAM, ROM and/or other persistent or non-transitory computer-readable storage media. The memory 210 may store an operating system 214 that provides computer program instructions for use by the processing unit 202 in the general administration and operation of the image processing service 102. The memory 210 may further include other information for implementing aspects of the present disclosure.

In one embodiment, the memory 210 includes an interface module 212. The interface module 212 can be configured to facilitate generating one or more user interfaces through which an image source provider 130, a third party user 140 or a color data provider 150 utilizing a compatible computing device, may send to, or receive from, the image processing service 102 image data, palette data, color name data, instruction data, metadata, color popularity data, etc., or otherwise communicate with the image processing service 102. Specifically, the interface module 212 can be configured to facilitate image processing functions described herein, including obtaining images, selecting palettes and corresponding updates, selecting color names and corresponding updates, validating metadata, etc. The user interface can be implemented as a graphical user interface (GUI), Web-based user interface, computer program, smart-phone or tablet program or application, touchscreen, wearable computing device interface, command line interface, gesture, voice, or text interface, etc., or any combination thereof. Furthermore, the user interfaces can include indicators when an image has been processed, when a palette or palette candidate has been generated or selected, when a color name has been selected as corresponding to an image and/or a color palette, or the like.

In addition, the memory 210 may include a data processing module 216 that may be executed by the processing unit 202. In one embodiment, the data processing module 216 implements aspects of the present disclosure. For example, the data processing module 216 can be configured to process image data, instructions, palette data, color name data, or metadata. Specifically, the data processing module 216 can be configured to perform image processing functions described herein, including image pre-processing, color distribution generation, representative color identification, palette candidate generation, palette determination, color name popularity processing, color name determination, metadata validation and updating, etc.

The image data processed by data processing module 216 can be of various formats. For example, the image data can correspond to an equation or table mapping illumination to x-y coordinates, a pixelized image, or other formats. Illustratively, in one embodiment, a color image is represented by a number of pixels organized in a two-dimensional array. In this embodiment, pixels can be associated with a value, which can be a vector based on a primary color model (e.g., RGB) or a luminance-chrominance model (e.g., Y'UV, YUV, YCbCr, or YPbPr).

It should be noted that the image processing service 102 may be implemented by some or all of the components present in the computing system 200 as discussed herein with respect to FIG. 2. In addition, the computing system 200 may include additional components not present in FIG. 2. The modules or components described above may also include additional modules or be implemented by computing devices that may not be depicted in FIG. 1 or 2. For example, although the interface module 212 and the data processing module 216 are identified in FIG. 2 as single modules, one skilled in the relevant art will appreciate that the modules may be implemented by two or more modules and in a distributed manner. As another example, the computing system 200 and its components can be implemented by network servers, application servers, database servers, combinations of the same, or the like, configured to facilitate data transmission to and from image source providers 130, third party users 140, or color name data providers 150, via network 120. Accordingly, the depictions of the modules are illustrative in nature.

Example Palette Generation Process

Figure 3:
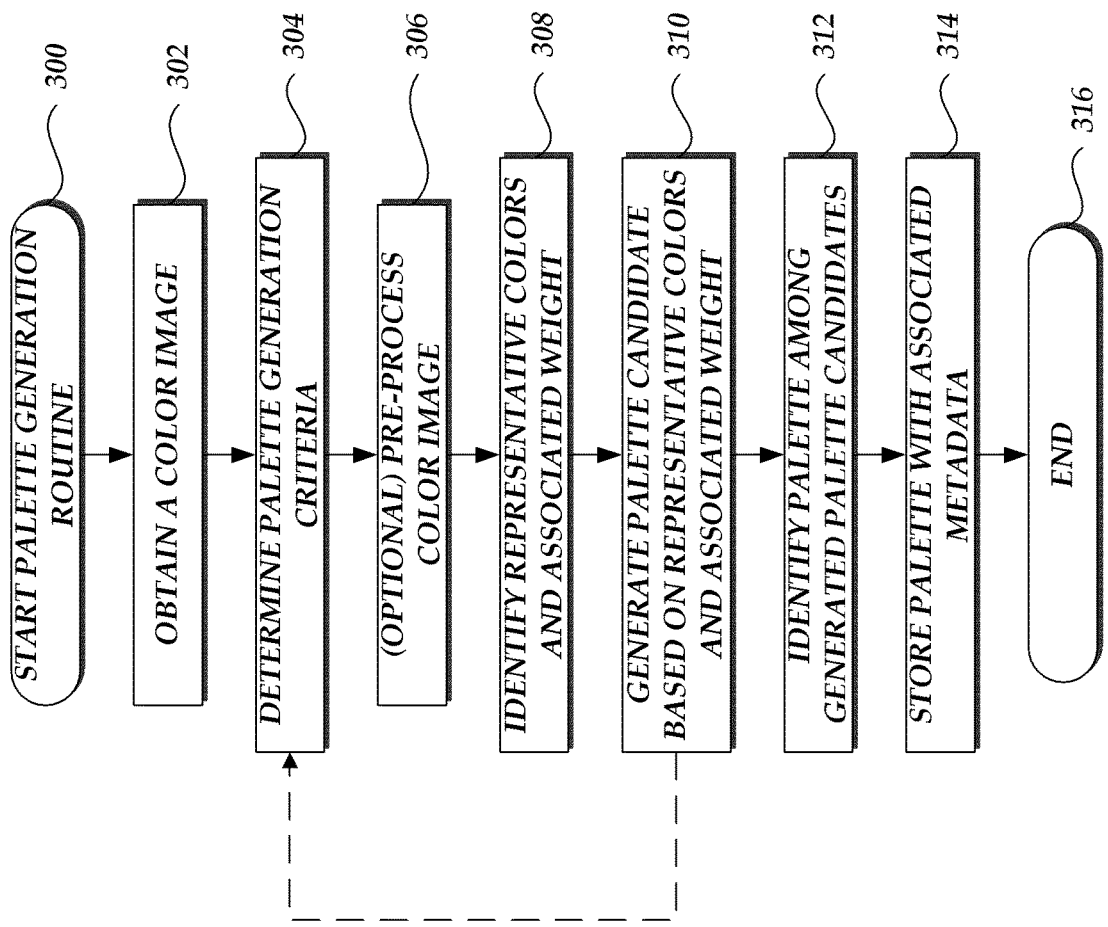
FIG. 3 is a flow diagram illustrating an embodiment of a palette generation routine implemented by the image processing service.

FIG. 3 is a flow diagram illustrating an embodiment of a palette generation routine implemented by the image processing service 102. The image processing service 102 begins the routine at block 300. At block 302, the image processing service 102 obtains a color image, such as color image 600 illustrated in FIG. 6. The color image can depict one or more items, a design, a scene, a landscape, or any other content of color. Obtaining the color image can be accomplished by receiving image data from image source providers 130 via their image data transmission to the image processing service 102. In one embodiment, images transmitted may be images designated for calibrating the image processing service 102. For example, images comprising specific scope or variance of colors may be used as the basis for a color space. In another embodiment, images transmitted may need to be manually, semi-manually, semi-automatically, or automatically assessed and filtered so as to only retain those relevant to a purpose of the palette to be generated.

Metadata associated with the color image can also be obtained. The metadata may include information corresponding to the colors, color scheme, lighting source, lighting direction, or other factors regarding the color rendering of the image. The metadata may also include information about the currently obtained color image, other color images, subjects or category of subjects depicted, sources contributing to the image, or their interrelations. The metadata can further include any other information associated with the color image as can be envisioned by a person of skill in the art.

At block 304, palette generation criteria are determined. As described earlier, the palette generation criteria can be input by an image source provider 130 or a third party consumer 140, who may correspond to a host of a commerce network site, a merchandise provider or vendor, a visitor to the commerce network site, a designer, an artist, an architect, or the like. Alternatively, or in addition, the palette generation criteria can be automatically generated by the image processing service 102, or another computing device or system. For example, features or patterns exhibited by the color image as well as associated metadata can be considered by an automated process to determine the palette generation criteria.

The palette generation criteria may indicate various preferences, factors, parameters, thresholds, or requirements that facilitate or control the palette generation routine performed by the image processing service 102, or its subroutines. For example, the palette generation criteria may indicate a computational method for pre-processing the obtained color image, for generating a color distribution, for identifying representative colors, for generating palette candidates, or for determining a palette. The palette generation criteria may also indicate parameters, thresholds, restraints, formula(e), or other factors that may inform various computational methods applicable to the routine or subroutines that it may invoke. For example, the palette generation criteria can identify a color distance formula or can include one or more thresholds of color distance for merging similar colors when representative colors are identified from a color image. For more information on how to determine a human perceptible color difference and the human color distance formula, please see U.S. patent application Ser. No. 14/316,483, entitled "IMAGE-BASED COLOR PALETTE GENERATION," filed on Jun. 26, 2014, and U.S. patent application Ser. No. 14/316,530, entitled "IMAGE-BASED COLOR PALETTE GENERATION," filed on Jun. 26, 2014, and U.S. patent application Ser. No. 14/316,528, entitled "IMAGE-BASED COLOR PALETTE GENERATION," filed on Jun. 26, 2014, and U.S. patent application Ser. No. 14/316,549, entitled "IMAGE-BASED COLOR PALETTE GENERATION," filed on Jun. 26, 2014, and each of which is incorporated by reference herein in its entirety.

In some embodiments, the obtained color image is pre-processed at block 306. For example, the color image may be converted to a format compatible with the palette generation routine 300 or its subroutines. The color image may also be classified or prioritized based on applicable metadata. Further, pre-processing can include noise removal, rotation, re-orientation, normalization in shape, size, resolution, or color, or other manipulations to facilitate relevant processes and methods.

Still further, pre-processing may include area marking or labeling within the color image. For example, various contour matching algorithms can be employed to mark out an area of interest. Alternatively, or in addition, areas of interest can be manually marked out. In some embodiments, a background, such as area 602 of color image 600, can be removed during pre-processing through area marking or labeling. In another embodiment, one or more areas of interest can be cropped or extracted so that only these areas form the basis for palette generation. In still another embodiment, area marking or labeling may indicate colors that should be treated in a specific way, such as to be ignored, to be associated with more or less weight, to disambiguate to a greater or lesser extent. Information corresponding to pre-processing can be included in corresponding metadata that is associated with the color image, which can facilitate palette generation.

Figure 4:
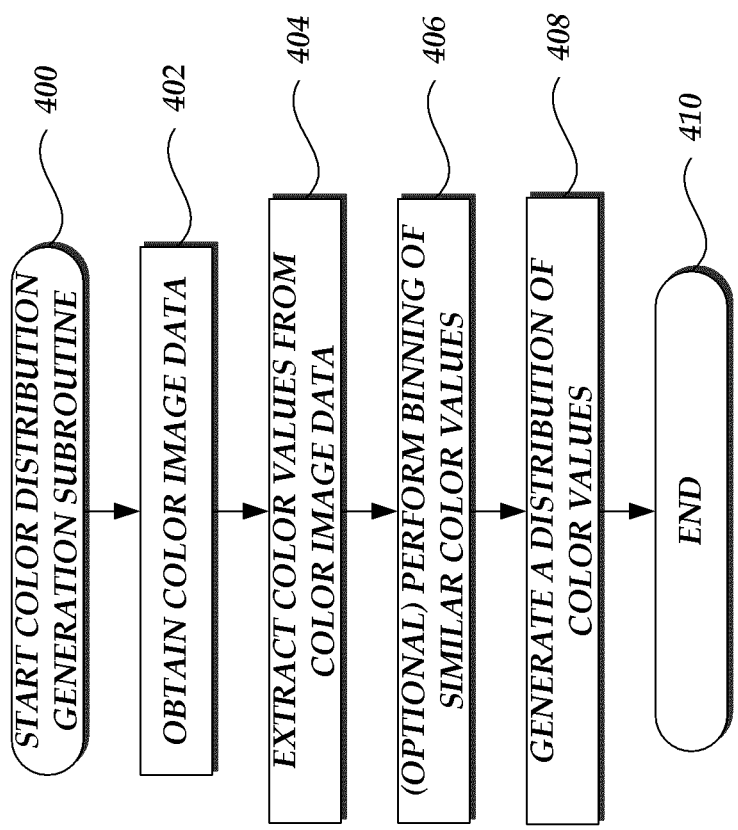
FIG. 4 is a flow diagram illustrating an embodiment of a color distribution generation subroutine implemented by the image processing service.
Figure 5:
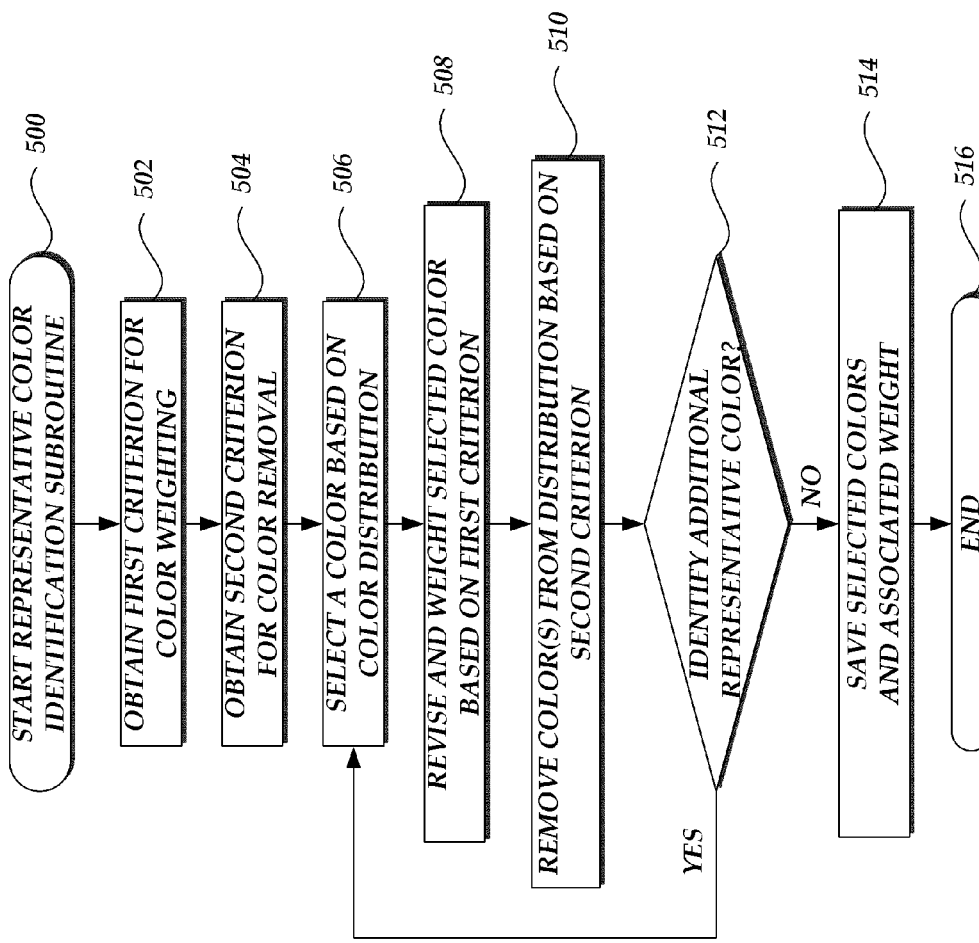
FIG. 5 is a flow diagram illustrating an embodiment of a representative color identification subroutine implemented by the image processing service.

At block 308, representative colors and their associated weights are identified from the obtained color image. The identification of representative colors may include multiple subroutines or sub-elements. Various image processing or clustering algorithms can be employed to achieve this. In some embodiments, a color distribution, such as a histogram illustrating distinct colors with their corresponding weight, is generated based on the color image. For example, the color distribution can be generated by invoking a subroutine as illustrated in FIG. 4 and as will be further described below. The generation of color distribution can be facilitated or controlled by information included in the palette generation criteria. For example, the palette generation criteria can indicate a set of standardized colors and/or binning criteria as bases for generating the color distribution. Once the color distribution is generated, representative colors can be identified based on the color distribution, for example, by invoking a subroutine as illustrated in FIG. 5 and further described below. The identification of representative colors can be facilitated or controlled by information included in the palette generation criteria or the metadata associated with the color image.

At block 310, a palette candidate is generated to include at least a subset of the identified representative colors and their associated weights. The palette candidate may further include metadata associated with the identified representative colors and weights.

In some embodiments, the palette generation criteria may specify or indicate criteria for determining which identified representative colors can be included in a palette candidate. For example, identified representative colors can each be associated with a weight. The palette generation criteria may indicate a threshold on the weights associated with identified colors to filter out colors that are relatively insignificant in the color image. The threshold can be dynamically generated based on a weight distribution of the identified representative colors. For example, the palette candidate can exclude identified representative colors associated with a weight lower than two standard deviations from a mean weight. Optionally, the image processing service 102 can move back to block 304, where new palette generation criteria can be determined. Based on the new palette generation criteria, a new palette candidate can be generated.

At block 312, one or more palettes can be identified among previously generated palette candidate(s). In some embodiments, each generated palette candidate is automatically considered a final palette so additional identification is not required at block 312. In other embodiments, one or more palettes are identified among multiple palette candidates based on palette generation criteria that may indicate whether the identification should be performed manually or automatically, which attributes should be examined, or what standards should be applied to the identification, or the like.

Identification of palettes can be accomplished manually or semi-manually. For example, by repeating the routine from block 304 to block 310, a third party consumer 140 may experiment with various palette generation criteria settings that can lead to generation of multiple palette candidates. In other words, each generated palette candidate can correspond to a distinct setting of palette generation criteria. The third party consumer 140 may then select one or more of the candidates and label them as palettes associated with the color image. Alternatively, or in addition, the identification of palettes can be accomplished automatically or semi-automatically by the image processing service 102, or by another computing device or system. For example, information associated with change of color values and associated weight across various palette candidates can be considered a function of certain settings included in palette generation criteria corresponding to the various palette candidates. Accordingly, various optimization algorithms, such as gradient methods, dynamic programming, evolutionary algorithms, combinatorial optimization, or stochastic optimization, can be utilized to pick a palette candidate(s) that achieves an optimization based on the function. Illustratively, a palette candidate can be selected if a corresponding rate of color value change is close to zero, as measured in accordance with the function.

Once identified, the one or more palettes can be stored, at block 314, at the palette data store 110, either by creating new data entries or updating existing palettes. The image processing service 102 then ends the routine at block 316. Depending on relevant requirements or preferences indicated in the palette generation criteria corresponding to identified palettes, various metadata can be associated therewith, for purposes of indicating their format, semantics, features, conditions, or the like. In some embodiments, metadata can link a palette to a corresponding color image from which the palette is derived. Alternatively, or in addition, metadata may indicate a category or a position in a taxonomy associated with the corresponding color image. Metadata can also indicate patterns, colocations, or other attributes of spatial distribution of palette colors within the corresponding color image.

Figure 6:
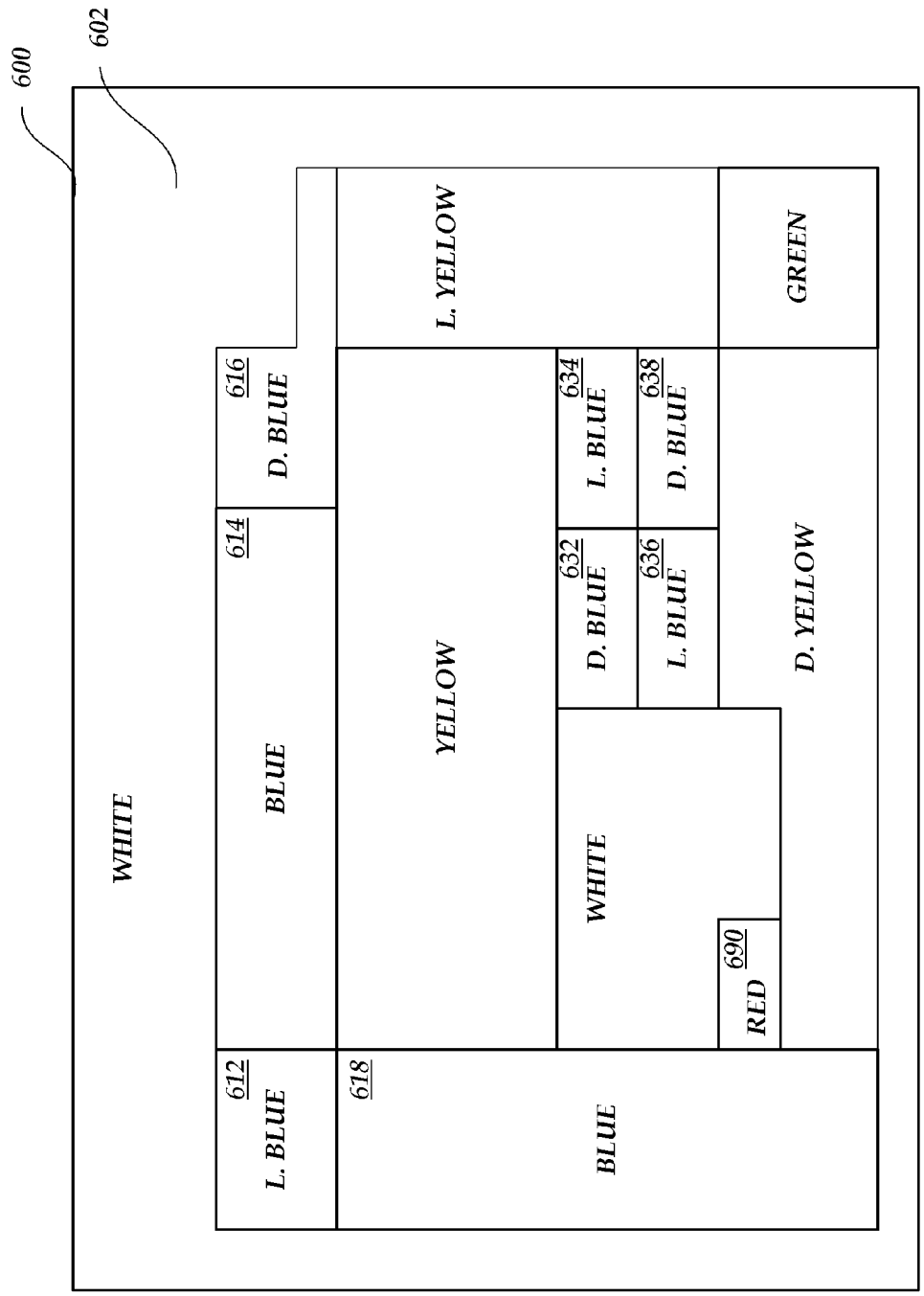
FIG. 6 is a simplified example of a color image depicting a plurality of colors.

For example, with reference to FIG. 6, assume a palette corresponding to a color image 600 includes palette colors BLUE, YELLOW, WHITE and GREEN. The metadata may indicate the position, spread and shape of these palette colors as they appear in relation to one another or in relation to the color image 600. As will also be explained in more detail in connection with FIG. 5, in some embodiments, palette color BLUE may be attributable to areas 612, 614, 616, 618, as well as areas 632, 634, 636 and 638 as shown in FIG. 6. Illustratively, the metadata may indicate that BLUE is depicted in two disjoint areas. The metadata may also indicate the relative size of the two areas, namely, combined areas 612, 614, 616 and 618 as compared to combined areas 632, 634, 636 and 638. In some embodiments, palette color BLUE may be attributable to areas 612, 614, 616 and 618 only. In these embodiments, the metadata may indicate that palette color BLUE does not correspond to areas 632, 634, 636 and 638. The metadata may further indicate a reason for excluding these areas, for example, due to certain pre-processing operations such as area-marking or labeling, due to spatial separation of colors as depicted in the color image 600, or the like.

Metadata associated with a palette can also include information derived from the metadata associated with a corresponding color image. As described earlier, such information may correspond to the colors, color scheme, lighting source, lighting direction, or other factors regarding the color rendering of the image. The metadata may also include information about interrelations between, or among colors, color images, subjects or category of subjects depicted, sources contributing to the image, or any other information associated with the image. For example, the metadata may indicate whether a palette color represents that of a subject, background, or foreground of the corresponding color image. Based on the palette data and associated metadata, the stored palettes can also be indexed, classified or clustered in various ways.

Metadata associated with a palette can further include information obtained from extrinsic sources that are related to the palette or one or more colors included in the palette. In some embodiments, color or palette trends can be determined based on voting or surveys of, for example, users of a social network site. The voting or survey results can be theme-specific or time-specific. For example, the voting or survey maybe a survey of most popular colors for Spring 2014, a voting result of a most liked palette for interior design of Seattle area homes, etc. Such temporal or subject related information can be included in the metadata. Based on such information, the metadata may include further information derived therefrom. For example, if an existing palette has consistent connections to popular palettes or colors associated with different times, the existing palette may be labeled as a timeless palette.

Example Color Distribution Generation Process

FIG. 4 is a flow diagram illustrating an embodiment of a color distribution generation subroutine implemented by an image processing service 102. The image processing service 102 begins the subroutine at block 400. At block 402, color image data is obtained. The color image data can be a color image in its original format, a pre-processed color image, or other representations of color values with or without associated metadata, depending on the color distribution algorithm employed.

At block 404, color values are extracted from the color image data. Illustratively, if an original or pre-processed color image is obtained, color values can be extracted from each pixel of the image. In some embodiments, the color values are vectors in a color space as discussed earlier. For example, the color values can be vectors in an RGB, Y'UV, YUV, YCbCr, or YPbPr based color space. The color values can also be represented or transformed into other mathematical formats, for example, based on various data compression techniques.

In other embodiments, the color values may include associated metadata values, such as coordinates of a pixel in a color image representing a corresponding color. In these embodiments, an illustrative color value can be a five-dimensional vector: the first three dimensions corresponding to the color and the remaining two dimensions corresponding to a location in the color image, such as x-y coordinates. In these embodiments, color values can be represented or transformed to other mathematical formats as well.

At block 406, similar color values can optionally be merged or binned in various ways. In some embodiments, one or more thresholds can be specified or automatically determined so that similar color values are binned. One or more color similarity measures (e.g., calculated based on a color distance formula, such as Euclidean distance in RGB based color space) can be used to quantify color similarity for the purpose of binning color values. For example, a plurality of standardized colors can be determined by the image processing service 102, as a basis for binning colors and generating a color distribution therefrom. Illustratively, the plurality of standardized colors can be X11 colors from the CSS3 specification or a set of Pantone colors. The plurality of standardized colors can be made consistent for a particular category of color image data, as a way to calibrate the color distribution generation process.

Each standardized color can be associated with a threshold. An extracted color value is placed in a bin corresponding to a distinct standardized color if a similarity measure of the two falls within the associated threshold. After binning, extracted color values are represented by their corresponding standardized colors. In this example, the plurality of standardized colors may or may not be uniformly distributed in a color space, and thresholds associated with individual standardized colors may or may not be the same. Illustratively, with reference to FIG. 6, a plurality of standardized colors for color image 600 can be {BLUE, YELLOW, RED}. After binning, LIGHT BLUE, DARK BLUE and GREEN may all be represented by BLUE as they are similar enough to BLUE. LIGHT YELLOW and WHITE may both be represented by YELLOW as they are similar enough to YELLOW. The binning process results in two heavy bins corresponding to the standardized colors BLUE and YELLOW and a light bin corresponding to the standardized color RED.

In some embodiments, extracted color values can be binned with one another if their respective similarity measure falls within a threshold, without referencing standardized colors. In this case, the binned color values can be represented by an average of individual bins.

At block 408, a distribution of color values is generated. For example, the distribution can be a histogram representing a number of pixels corresponding to distinct color values derived from the color image data, with or without binning. As another example, the distribution can be a percentage breakdown of distinct colors derived from the color image data, with or without binning. At block 410, the image processing service 102 ends the routine.

Example Representative Color Identification Process

FIG. 5 is a flow diagram illustrating an embodiment of a representative color identification subroutine implemented by an image processing service 102. The image processing service 102 begins the routine at block 500. At block 502, the image processing service 102 obtains a first criterion for weighting representative colors as they are identified. At block 504, the image processing service 102 obtains a second criterion for removing identified representative color(s) from a color distribution. The first or second criterion can be included in, or derived from, the palette generation criteria as described earlier. In some embodiments, the first and second criteria can be one or more thresholds of a color distance, or other similarity measures between, or among, color values. Illustratively, various color distance formula or models, such as CIEDE2000, CMC 1:c, or the like, can be utilized to compute color distance between colors.

In some embodiments, similarity measures that take into account both color and metadata components can be designed or adopted. Referencing FIG. 6 again and taking color image 600 for example, the similarity of two specific colors can vary depending on the colocation or context of corresponding pixels. Illustratively, LIGHT BLUE as depicted by area 612 and DARK BLUE as depicted by area 616 may be considered sufficiently similar to BLUE as depicted by areas 614 and 618. In comparison, LIGHT BLUE as depicted by areas 634 or 636 or DARK BLUE as depicted by areas 632 or 638 may not be considered sufficiently similar to BLUE as depicted by areas 614 and 618 due to the spatial distance or connection of corresponding areas.

Referencing FIG. 5, at block 506, a color (as represented by a color value) is selected based on a color distribution. Illustratively, the color distribution can be generated by the routine of FIG. 4 as described above. Various methods can be adopted to select a color from the color distribution. In some embodiments, the color selection can be based on a dominance of colors in the color distribution. For example, the most dominant color of the color distribution can be selected. The most dominant color can be a distinct color accounting for the largest portion of the color distribution as compared to other distinct colors. In these embodiments, however, the most dominant color may initially stand for a background color. For example, the most dominant color may be similar enough to a background color indicated by metadata associated with the color image. Alternatively, or in addition, the most dominant color may be similar enough to a color depicted by the four corners of the color image, which may be considered a background color. In this case, the first selected color may not be considered a representative color and may not be subsequently saved for generating a palette candidate.

In some embodiments, one or more base colors (e.g., black, white, etc.) can be defined, and the first color selected from the color distribution can be a most distant color from the base color(s). One of relevant skill in the art can envision that different base colors may lead to different sets of subsequently identified representative colors, even for a same color distribution. Accordingly, in these embodiments, defining the base color(s) and applying the base color(s) consistently toward a category of color images (and their color distributions) may constitute one way to calibrate the palette generation process. The definition of the base color(s) can be indicated or derived from the palette generation criteria as described earlier.

In some embodiments, a most concentrated color of the color distribution can be selected. A concentration formula can be designed or adopted. For example, color values can be grouped using various clustering or grouping algorithms. Intra-group similarity measure, such as standard deviation of pairwise color distance, can be calculated. The group of colors whose constituents are most similar to one another can be picked, and a color representing the group can be determined and selected. In this example, the color selected can be an average color of the group based on certain color distance formula.

In other embodiments, a color can be selected based on color-related voting or surveys. A popularity of colors among a group of users can be obtained from one or more third party data providers 150 to facilitate the color selection. For example, a color in the color distribution that is most similar to a popular color as indicated by users of a social network site can be selected. In one embodiment, the popular color can be determined based on user votes on a variety of colors derived from the color distribution. In another embodiment, the popular color can be determined based on user votes on one or more colors that users think are most distinct from or compatible with one or more predetermined base colors. In this case, a predetermined base color can be a representative color that is already identified from the color distribution.

As another example, a popular color palette as indicated by users of a social network site can be obtained to facilitate the color selection. In this example, the color selected can be a color in the color distribution that is most similar to a specific color included in the popular color palette. In one embodiment, users of the social network site can vote on various existing color palettes. Existing color palettes can be classified based on their corresponding palette colors, associated weights and associated metadata to facilitate meaningful voting. In another embodiment, the color selected can be a color included in a popular color palette that also includes one or more predetermined base colors. In this case, a predetermined base color can be a representative color that is already identified from the color distribution.

As still another example, the color selected can be a popular color associated with a subject or category of subject as depicted by the color image corresponding to the color distribution. The popular color can also correspond to a specific date or time period. Illustratively, the color image can depict a mannequin wearing various clothing items. The color selected can be a popular fashion color of the current season as voted by users of a social network site.

In still other embodiments, a color can simply be manually picked or randomly selected from the color distribution. For example, the color can be manually picked based on a color name or color scheme that is associated with the color image forming the basis of the color distribution. Illustratively, a color scheme can indicate a choice of colors that correspond to a particular style or appeal. A color scheme may be associated with descriptive or suggestive names, such as sunset, tropical, nostalgia, etc. A color scheme may or may not correspond to a precise mapping to a set of colors. As described earlier, metadata such as colocations or connections between colors as they are visually depicted in a corresponding color image can be taken into account for computing color similarity measures for all these embodiments.

At block 508, the selected color is revised to be identified as a representative color and is weighted based on the first criterion. In some embodiments, the first criterion can include one or more thresholds for revising and weighting the selected color. For example, colors of the color distribution that are within a threshold distance from the selected color can be merged therewith and the selected color can be revised to reflect a color representing all merged colors. The representative color can be a function of all merged color values, such as their "center of mass" based on certain color distance formula(e) or a most frequent color of all merged colors. Accordingly, the representative color can be weighted based on the quantity of merged colors, such as, the number of pixels depicting any of the merged colors. Alternatively, the weight associated with the representative color can be a percentage that the merged colors account for in the color distribution, or its variant.

Similarly, metadata such as colocations or connections between colors as they are visually depicted in a corresponding color image can be taken into account. Referencing again to FIG. 6 and taking color image 600 for example, suppose DARK BLUE as depicted by area 616 is the selected color. BLUE and LIGHT BLUE as depicted by areas 614, 612 and 618 may be merged with DARK BLUE of area 616, while DARK BLUE of areas 632, 638 and LIGHT BLUE of areas 634, 636 may not. Illustratively, the corresponding representative color becomes BLUE, as LIGHT BLUE of area 612 and DARK BLUE of area 616 cancel each other out when computing a "center of mass." Also, the weight associated with representative color BLUE excludes pixels of areas 632, 634, 636 and 638.

Referencing to FIG. 5, at block 510, one or more colors are removed from the color distribution based on the second criterion to facilitate identification of additional representative colors. The color removal can be based on the currently identified representative color. In some embodiments, the second criterion can include one or more thresholds for color removal. For example, colors in the color distribution that are within a threshold distance from the currently identified representative color can be removed from the color distribution and will not be considered in further identification of additional representative colors. In other words, the color distribution is updated based on the second criterion to only retain colors that are dissimilar enough to the currently identified representative color. The one or more thresholds included in the second criterion may or may not be the same as those included in the first criterion.

Again, metadata such as colocations or connections between colors as they are visually depicted in a corresponding color image can be taken into account. Continuing the example above in connection with color image 600 of FIG. 6, illustratively the LIGHT BLUE, BLUE and DARK BLUE colors attributable to areas 612, 614, 616 and 618 are removed from the color distribution, while the LIGHT and DARK BLUEs attributable to areas 632, 634, 636 and 638 remain. As will be described in more detail below, LIGHT or DARK BLUEs attributable to areas 632, 634, 636 or 638 may be selected as a basis for identifying another representative color.

Returning to FIG. 5, at block 512, the image processing service 102 determines whether additional representative colors are to be identified. In some embodiments, the determination can be based on a limit on the number of representative colors. For example, the palette generation criteria may specify a fixed number or a maximum number of representative colors each palette candidate may include. In some embodiments, the determination can be based on the colors that remain in the color distribution. For example, the ratio of weight between the remaining colors and all colors in the original distribution can be monitored to facilitate this determination. Illustratively, if the remaining colors account for a small enough portion of the original color distribution (e.g., only RED as depicted in FIG. 6 by a small enough area 690 remains), then no more representative colors need to be identified. As another example, the similarity among remaining colors can be monitored to facilitate this determination.

Illustratively, if the average pairwise color distance of remaining colors is small enough, the remaining colors can be merged to form a final representative color and weighted accordingly. In other embodiments, the determination can be based on identified representative colors. For example, the palette generation criteria may indicate ways to assess the weight distribution associated with identified representative colors. Illustratively, the skewness, divergence, or other measures of the weight distribution can be utilized to facilitate the determination.

If it is determined that additional representative colors need to be identified, the image processing service 102 proceeds to block 506 where a next color is selected from the updated color distribution. In accordance with embodiments where a color is selected based on its distance from one or more base colors, the base colors are updated to reflect recently identified representative color(s). In other words, an identified representative color becomes one of the base colors in a subsequent iteration. For example, at block 506, the next color selected from an updated color distribution can be a color farthest away from one or more representative colors identified in previous iterations. As another example, the next color selected can be a color farthest away from a combination of all previously identified representative colors. If it is determined that further identification of representative colors is not needed, the image processing service 102 proceeds to block 514.

At block 514, the identified representative colors and their associated weight are saved to create a palette candidate. Additionally, metadata can be associated therewith. For example, relative locations, subjects or items represented, distribution patterns, or the like, that are associated with identified representative colors can be saved and linked to respective representative colors. The image processing service 102 ends the subroutine 500 at block 516. For more example details on extracting colors from an image and building a color palette, see U.S. patent application Ser. No. 14/316,483, entitled "IMAGE-BASED COLOR PALETTE GENERATION"filed on Jun. 26, 2014, And U.S. patent application Ser. No. 14/316,292, entitled "BUILDING A PALETTE OF COLORS BASED ON HUMAN COLOR PREFERENCES," filed on Jun. 26, 2014, each of which is incorporated by reference herein in its entirety.

Example Color Name Generation Process

Figure 7:
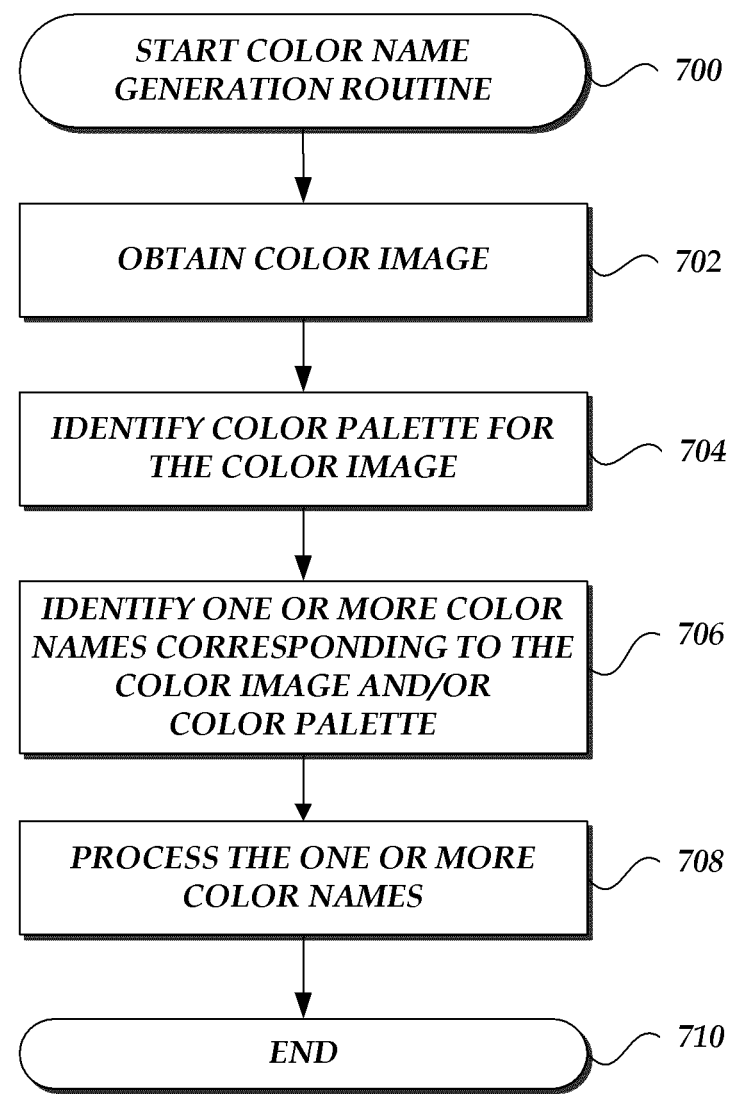
FIG. 7 is a flow diagram illustrating an embodiment of a color name generation routine implemented by the image processing service.

FIG. 7 is a flow diagram illustrating an embodiment of a color name generation routine implemented by an image processing service 102. The image processing service begins the routine at block 700. At block 702, the image processing service 102 obtains a color image such as color image 600 illustrated in FIG. 6 and as similarly described with respect to block 302 of FIG. 3. As noted above, the color image can depict one or more items, a design, a scene, a landscape, or any other content of color. Obtaining the color image can be accomplished by receiving image data from image source providers 130 via their image data transmission to the image processing service 102.

Metadata associated with the color image can also be obtained. The metadata may include information corresponding to the colors, color scheme, lighting source, lighting direction, or other factors regarding the color rendering of the image. The metadata may also include information about the currently obtained color image, other color images, subjects or category of subjects depicted, sources contributing to the image, or their interrelations. The metadata can further include any other information associated with the color image as can be envisioned by a person of skill in the art.

At block 704, the image processing service 102 optionally identifies a color palette corresponding to the obtained image. In one embodiment, this color palette identification may correspond to the palette generation routine 300 described above and in reference to FIG. 3. In another embodiment, one or more color palettes may be determined from metadata associated with the color image. For example, the image metadata may include one or more color palettes and/or one or more associated color identifiers that can be used to create a color palette.

Once identified, the one or more palettes can be stored at the palette data store 110, either by creating new data entries or updating existing palettes. In addition, metadata associated with the identified palette may also be identified and stored at the palette data store 110. In some embodiments, metadata can link a palette to a corresponding color image from which the palette is derived. Metadata associated with a palette can also include information derived from the metadata associated with a corresponding color image. As described earlier, such information may correspond to the colors, color scheme, lighting source, lighting direction, or other factors regarding the color rendering of the image. The metadata may also include information about interrelations between, or among colors, color images, subjects or category of subjects depicted, sources contributing to the image, or any other information associated with the image. For example, the metadata may indicate whether a palette color represents that of a subject, background, or foreground of the corresponding color image. Based on the palette data and associated metadata, the stored palettes can also be indexed, classified or clustered in various ways.

Metadata associated with a palette can further include information obtained from extrinsic sources that are related to the palette or one or more colors included in the palette. In some embodiments, color or palette trends can be determined based on voting or surveys of, for example, users of a social network site. The voting or survey results can be theme- or time-specific, for example, a survey of most popular colors for Spring 2014, a voting result of a most liked palette for interior design of Seattle area homes, etc. Such temporal or subject related information can be included in the metadata. Based on such information, the metadata may include further information derived therefrom. For example, if an existing palette has consistent connections to popular palettes or colors associated with different times, the existing palette may be labeled as a timeless palette. In addition or alternatively, color trend information can be determined in other ways, such as by analysis of item purchase histories, item viewing histories, collections of images (such as those associated with particular periods of time), and the like.

At block 706, the image processing service 102 identifies one or more color names based at least in part on color name popularity information, where the one or more color names correspond to the obtained color image and/or the determined color palette. In one embodiment, the image processing service 102 identifies a color name, based at least in part on color name popularity information, for each color identified in the color palette at block 704. In addition or alternatively, the image processing service 102 identifies a color name, again based at least in part on color name popularity information, for each color identified in the obtained color image at block 702, such colors identified, for example, via metadata associated with the color image (e.g., other color identifiers). Color name popularity information may be identified from color name-related voting results provided by a social network site, such as those that show people colors and asked that they type in a color name that they might use for that color. Color name popularity information may also be obtained from a number of other sources and/or analyses. For example, color name popularity information may be obtained by analysis of item purchase histories, item viewing histories, collections of images (such as those associated with particular periods of time), collections of colors (such as paint colors and actions of vendors and/or users associated therewith), and the like.

In one embodiment, the obtained color image and/or the identified color palette have associated 3-dimensional RGB colors, for example, which are stored as metadata associated with the obtained color image and/or the identified color palette in a data store, such as item data store 112 and/or color palette data store 110. In one example, the RGB color value (e.g., #c108e5) may be stored in the data store in association with a green image and/or a green color palette. While the prior example provides RGB color identifiers as associated with the obtained color image and/or the identified color palette, other color identifiers, such as those corresponding to other dimensional color spaces, may be associated with the obtained color image and/or the identified color palette. For example, other color identifiers may correspond to the color spaces of XYZ, Hue Saturation Brightness/Luminance (HSB/HSL), Hue Saturation Value (HSV), Hue Saturation Intensity (HIS), Cyan Magenta Yellow Key (CMYK), Lab, Lightness Chroma Hue (LCH), LMS, YCbCr and Y'CbCr as used in image or video, Tint Saturation Lightness (TSL), Red Green (RG), YIQ (as used by the NTSC color TV system), and YUV (as used by the PAL color TV system).

After identification of the color identifier(s) associated with the obtained color image and/or identified color palette, the image processing service 102 may then use the color identifier(s) to identify one or more corresponding color names based at least in part on color name popularity information. As noted above, the color name popularity information may be obtained from a color name survey. A color name survey may, for example, map individual color identifiers, for which corresponding colors have been displayed to a community of survey participants, with color names voted on by the community as corresponding to the colors. Accordingly, the survey may provide the most common color names for colors as perceived by a community of survey participants. The image processing service 102 may thus identify one or more color names, such as those rated as most popular or most frequently provided for a particular color, as corresponding to the obtained color image and/or identified color palette.

In some embodiments, the image processing service 102 may consider additional information associated with the color popularity information in the identification of one or more color names at block 706. For example, metadata corresponding to the color name to color identifier associations, such as date or season of creation of individual associations, associated demographics of the survey participants or some portion thereof (e.g., geographical region, age, gender, ethnic group, religion, etc. of users that provided input used in generating the color names), or the like, may be considered. For example, if the obtained color image corresponds to an image provided by an individual located in Seattle, Wash. (as determined by metadata associated with the color image), the image processing service 102 may identify corresponding color names based on color popularity information obtained specifically from a community of survey participants located in the state of Washington or the northwest region of the U.S. Specifically, if the color image obtained from a user in Seattle depicts the general colors green and blue, the corresponding color names obtained from survey participants located in the state of Washington as corresponding to those colors may be bright green and pacific blue or the green and blue of a popular local sports team. However, a different demographic of survey participants may have provided different color names as highly popular color names corresponding to these colors. Accordingly, the image processing service 102 may filter color name popularity information based on additional metadata to identify one or more color names corresponding to a color image and/or color palette.

In some embodiments, the image processing service 102 can use a fast color indexing routine to create one or more fast color search data stores for colors identified in the obtained image, identified color palette, and/or the popular color name to color identifier associations, as described in U.S. patent application Ser. No. 14/315,700, entitled "FAST COLOR SEARCHING," filed on Jun. 26, 2014, which is incorporated by reference herein in its entirety. In addition to creation of the one or more fast color search data stores, the image processing service 102 can use the fast color indexing routine to quickly identify color names corresponding to a color image and/or a color palette.

At block 708, the image processing service 102 may process the one or more color names identified at block 706. Such processing may include any one or more of storing one or more of the identified color names as metadata associated with the obtained color image and/or the identified color palette, storing individual associations between individual identified color names and the respective colors from the color image and/or the color palette to generate a color name database, updating the metadata corresponding to the color image and/or color palette with one or more of the identified color names, validating color names provided as part of a user search query or as originally associated with an image and/or a color palette with preferred color names, such as those identified at block 706, for colors in the corresponding images and/or palettes, and the like.

As one example, where the image processing service 102 identifies, at block 706, a color name for each color identified in the color palette based at least in part on color name popularity information, the image processing service 102 may store, at block 708, the identified color name for each color identified in the color palette as metadata associated with the color image. In addition or alternatively, the image processing service 102 may store, at block 708, the identified color name for each color identified in the color palette in a color palette data store as metadata associated with the color palette, and/or the image processing service 102 may store individual associations between individual identified color names and the respective colors from the color palette to generate a color name database.

As another example, the processing at block 708 may include comparing one or more of the identified color names from block 706 with metadata corresponding to the color image and/or color palette and updating the metadata corresponding to the color image and/or color palette with one or more of the identified color names. In some embodiments, updating the metadata corresponding to the color image (from block 702) and/or the color palette (from block 704) includes supplementing the metadata corresponding to the color image and/or the color palette with only the identified color names corresponding to colors in the color image and/or the color palette without a corresponding color name in the metadata.

As a yet further example, the processing at block 708 may include identifying missing color names from color images and/or color palettes and supplementing metadata associated with the images and/or color palettes with the missing color names. Still further, in other embodiments, the processing at block 708 may include validating color names originally associated with an image and/or a color palette with preferred color names, such as the identified color names at block 706, for colors in the corresponding images and/or palettes. The image processing service 102 ends the routine at block 710.

In another embodiment of a color name generation routine implemented by the image processing service 102, the image processing service 102 may eliminate the initial element of obtaining a color image at block 702 of FIG. 7 and instead commence with identification of a color palette at block 704. The remaining functions described in FIG. 7 may then be implemented with respect to the originally identified color palette. In this way, color name popularity information can be used to identify one or more color names and process these one or more color names in association with the identified color palette in order to improve color name metadata associated with the color palette and stored in the color palette data store 110 or elsewhere.

One skilled in the relevant art will appreciate that actions outlined above for the color name generation routine may be implemented by one or more services, such as any one or more of the image processing service 102, a color name generation service, or the like. One skilled in the relevant art will further appreciate that the actions of these one or more services may be implemented by one or more computing devices/components/modules, such as those identified in reference to the computing system 200 or otherwise.

Example Color Name Validation Process

A merchandiser (or other vendor) may submit an image, such as a photograph, of an item for posting on an item detail page of a commerce site via which consumers may purchase the item. Typically, the image will be associated with metadata provided by the merchandiser, including one or more color names identifying the item (or items) in the image. However, not infrequently, the color name submitted by the merchandiser (or other source) is in error and does not match the color of the item in the image. For example, an image of a blue dress may be submitted with a color name of "purple." Having erroneous color names results in inaccurate image records and can result in incomplete or inaccurate recommendations and/or surfacing of search results. Thus, for example, if a search is performed for a blue dress (e.g., in response to a user query and/or as part of a recommendation process), the blue dress mistakenly tagged with the color name "purple" may not be identified in the search or to the user. Conversely, if a search is performed for a purple dress, the blue dress mistakenly tagged with the color name "purple" will be erroneously identified in the search and to the user as part of a recommendation.

Certain embodiments address the foregoing challenges by determining when certain image metadata, such as a color name, does not match the color palette of an item in the image. As will be discussed in greater detail below, the image processing service 102 accesses an image and associated metadata, including color names; processes the image to generate one or more color palettes; utilizes the color palettes to identify corresponding color names; and determines if the identified color names match the color names in the metadata. If the color names from the metadata do not match those determined from the generated color palettes, the image processing service 102 edits the metadata to include the color names determined from the generated color palettes and/or alerts an entity (such as an operator and/or the entity that provided the image) via a transmitted mismatch notification regarding the mismatch. In response to the mismatch notification, the entity that provided the image can manually compare the color names from the image metadata that do not match those color names determined from the generated palettes, enabling the entity to determine which color name is correct. The entity can then select the appropriate color name to be stored as metadata with the image. Thus, searches and recommendations related to the item will be more accurate and complete.

Similarly, if an image is provided that does not include a color name, the image processing service 102 processes the image to generate one or more color palettes, utilizes the color palettes to identify corresponding color names, and edits the metadata to include the color names determined from the generated color palettes. This enables the item to be discovered in a search for the item type or category having the color as a search parameter. For example, the search may be performed in response to a user query (e.g., including a user provided or selected keyword and/or image) and/or as part of a recommendation process. Thus, searches and recommendations related to the item will be more accurate and complete.

Figure 8:
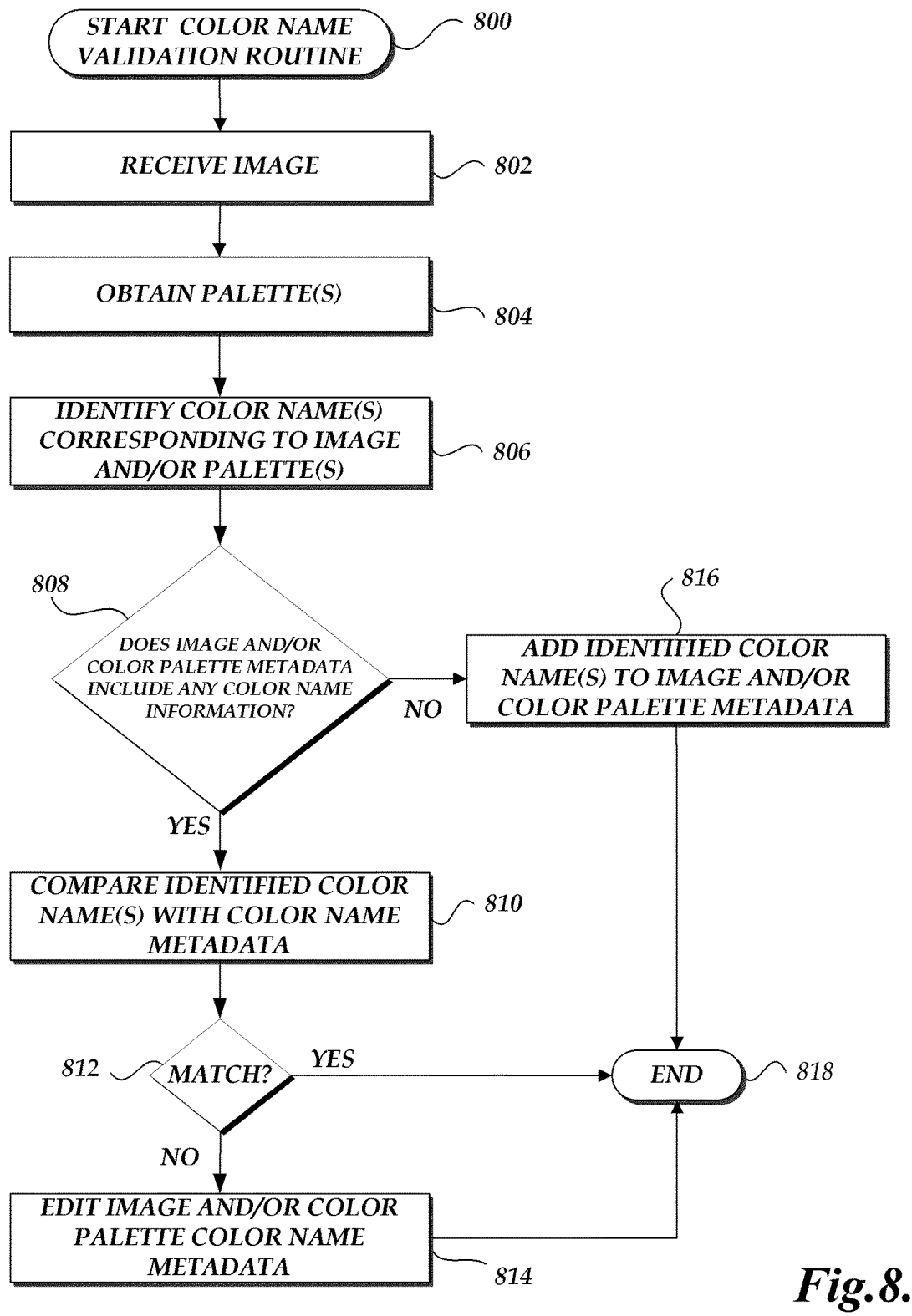
FIG. 8 is a flow diagram illustrating an embodiment of a validation routine implemented by the image processing service.

FIG. 8 is a flow diagram illustrating an embodiment of a color name validation routine implemented by the image processing service 102. The image processing service 102 begins the routine at block 800. At block 802, the image processing service 102 obtains a color image. The color image can depict one or more items (e.g., clothing, furniture, appliances, etc.), a design, a scene, a landscape, or any other content of color. Obtaining the color image can be accomplished by receiving image data from the item data store 112, image source providers 130, third party users 140 (e.g., consumers or merchandisers seeking to sell items), or other image sources, via their image data transmission to the image processing service 102.

Metadata associated with the color image can also be obtained. The metadata may include information corresponding to the color palette (e.g., color names or other color identifiers, including names expressed using ASCII characters, icons, or other such data), color scheme, lighting source, lighting direction, or other factors regarding the color rendering of the image. The metadata may also include information about the currently obtained color image, other color images, subjects or category of subjects depicted, sources contributing to the image, or their interrelations. The metadata can further include any other information associated with the color image as can be envisioned by a person of skill in the art.

At block 804, one or more color palettes are generated and/or determined for the image. For example, the techniques described above with respect to FIG. 3 or as disclosed in U.S. patent application Ser. No. 14/316,483, entitled "IMAGE-BASED COLOR PALETTE GENERATION," filed on Jun. 26, 2014, and U.S. patent application Ser. No. 14/316,292,entitled "BUILDING A PALETTE OF COLORS BASED ON HUMAN COLOR PREFERENCES," filed on Jun. 26, 2014, each of which are incorporated by reference herein in their entirety, may be used. The color palette(s) may be generated so that the color palette(s) reflect the primary color of the item being depicted, rather than the background scene or non-relevant items (e.g., by ignoring or placing less emphasis on color information towards the edges of the image). In another embodiment, one or more color palettes may be determined from metadata associated with the color image. For example, the image metadata may include one or more color palettes and/or one or more associated color identifiers that can be used to create a color palette.

Metadata associated with the color palette can also be obtained. The metadata may include information textually indicating the color(s) included in the color palette using color name(s) or other identifier(s) (including names expressed using ASCII characters, icons, or other such data), and optionally indicating their format, semantics, features, conditions, sources, date(s) of creation/editing, associated demographics (e.g., geographical region, age, gender, ethnic group, religion, etc. of users that provided input used in creating the palette), or the like.

At block 806, the image processing service 102 identifies one or more color names based at least in part on color name popularity information, where the one or more color names correspond to the obtained color image and/or the determined color palette. In one embodiment, the image processing service 102 identifies a color name, based at least in part on color name popularity information, for each color identified in the color palette at block 804. In addition or alternatively, the image processing service 102 identifies a color name, again based at least in part on color name popularity information, for each color identified as associated with the obtained color image at block 802. Color name popularity information may be identified from color name-related voting results provided by a social network site, such as those that show people colors and asked that they type in a color name that they might use for that color. As noted above, color name popularity information may also be obtained from a number of other sources and/or analyses. For example, color name popularity information may be obtained by analysis of item purchase histories, item viewing histories, collections of images (such as those associated with particular periods of time), collections of colors (such as paint colors and actions of vendors and/or users associated therewith), and the like. Functions at block 806 may further correspond to similar functions as described above with respect to block 706 of FIG. 7.

At block 808, a determination is made as to whether the metadata received in association with the image (obtained at block 802) and/or the color palette (determined at block 804) includes color identification information, such as a color name. If a determination is made that the metadata received in association with the image and/or the color palette does not include color identification information, such as a color name, then at block 816 the identified color name (from block 806) may be stored as metadata in association with the image (e.g., in item data store 112, a dedicated image data store, or elsewhere) and/or the color palette (e.g., in palette data store 110 or elsewhere).

If a determination is made that the metadata received in association with the image and/or the color palette does include color identification information, such as a color name, then at block 810 a comparison is made between color identification information, such as a color name, identified at block 806 based at least in part on color popularity information and the color identification information, such as a color name, obtained via the image metadata at block 802 and/or the color palette metadata at block 804. If, at block 812, a determination is made that the color identification information, such as a color name, identified at block 806 based at least in part on color popularity information and the color identification information, such as a color name, obtained via the image metadata at block 802 and/or the color palette metadata at block 804 sufficiently match, then at block 818 the image processing service 102 completes the routine. If, at block 812, a determination is made that the color identification information, such as a color name, identified at block 806 based at least in part on color popularity information and the color identification information, such as a color name, obtained via the image metadata at block 802 and/or the color palette metadata at block 804 do not sufficiently match, then at block 814 the identified color name (or other identifier) may be stored as metadata in association with the image (e.g., in item data store 112, a dedicated image data store, or elsewhere) and/or in association with the color palette (e.g., in color palette data store 110 or elsewhere) and optionally the original color name (or other identifier) included in the metadata is deleted or an indication is stored that the original color name is mismatched and incorrect. At block 818, the image processing service 102 ends the routine 800.

In another embodiment of a color name validation routine implemented by the image processing service 102, the image processing service 102 may eliminate the initial element of obtaining a color image at block 802 of FIG. 8 and instead commence with identification of a color palette at block 804. The remaining functions described in FIG. 8 may then be implemented with respect to the originally identified color palette. In this way, color name popularity information can be used to identify color names and validate color names associated with color palettes in order to improve color name metadata associated with color palettes stored in the color palette data store 110 or elsewhere.

One skilled in the relevant art will appreciate that actions outlined above for the color name validation routine may be implemented by one or more services, such as any one or more of the image processing service 102, a color name generation service, a color name validation service, or the like. One skilled in the relevant art will further appreciate that the actions of these one or more services may be implemented by one or more computing devices/components/modules, such as those identified in reference to the computing system 200 or otherwise.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain aspects of the embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
    under control of a hardware computing device configured with specific computer-executable instructions,
        accessing a first color image and associated first color image metadata provided by a source for inclusion in an electronic catalog;
        generating a first color palette by identifying a plurality of representative colors and associated weights from a color distribution corresponding to the first color image;
        determining a color name for each color in the first color palette based at least in part on color name popularity information; and
        adding at least one determined color name to the first color image metadata based, at least in part, on a determination that the at least one determined color name is not included in the first color image metadata and based, at least in part, on a comparison of metadata associated with the color name popularity information and the first color image metadata, wherein the comparison does not include a comparison of color names.

2. The computer-implemented method of claim 1, wherein the first color palette is associated with color palette metadata, and wherein the computer-implemented method further comprises:
    adding at least one determined color name to the color palette metadata based, at least in part, on a determination that the at least one determined color name is not included in the first color image metadata.

3. The computer-implemented method of claim 1 further comprising transmitting a notification to an entity that provided the first color image based, at least in part, on a determination that a color name included in the first color image metadata does not correspond to the determined color name for a respective color in the first color palette.

4. The computer-implemented method of claim 1 further comprising deleting a color name included in the first color image metadata if a color name included in the first color image metadata does not correspond to the determined color name for a respective color in the first color palette.

5. The computer-implemented method of claim 1 further comprising storing a mismatch indication in the first color image metadata if a color name included in the first color image metadata does not correspond to the determined color name for a respective color in the first color palette.

6. A system comprising:
    a non-transitory, computer-readable data store configured to at least store computer-executable instructions; and a hardware processor in communication with the data store, the hardware processor configured to execute the computer-executable instructions to at least:

generate a color palette corresponding to a color image having associated color image metadata;

determine one or more color names corresponding to the color palette based at least in part on color name popularity information; and add at least one determined color name of one or more determined color names to the first color image metadata based, at least in part, on a determination that the at least one determined color name is not included in the first color image metadata and based, at least in part, on a comparison of color name metadata associated with the color name popularity information and the color image metadata associated with the color image, wherein the comparison does not include a comparison of color names.

7. The system of claim 6, wherein the color name popularity information is obtained from a color name survey.

8. The system of claim 7, wherein the color name survey includes the color name metadata, wherein the color name metadata is associated with individual color names in the color name survey, and wherein the color name metadata includes at least one of a calendar date, a season, or a geographic location of a user voting on popularity of a color name.

9. The system of claim 6, wherein the color palette is associated with color palette metadata.

10. The system of claim 9, wherein the hardware processor is further configured to execute the computer-executable instructions to at least:

add at least one determined color name of the one or more determined color names to the color palette metadata based, at least in part, on a determination that the at least one determined color name is not included in the first color image metadata.

11. The system of claim 6, wherein the hardware processor is further configured to execute the computer-executable instructions to at least transmit a notification to an entity that provided the color image based, at least in part, on a determination that a color name included in the color image metadata does not correspond to the determined color name for a respective color in the color palette.

12. The system of claim 6, wherein the hardware processor is further configured to execute the computer-executable instructions to at least delete a color name included in the color image metadata if a color name included in the color image metadata does not correspond to the determined color name for a respective color in the color palette.

13. The system of claim 6, wherein the hardware processor is further configured to execute the computer-executable instructions to at least store a mismatch indication in the first color image metadata if a color name included in the first color image metadata does not correspond to the determined color name for a respective color in the color palette.

14. A non-transitory computer-readable storage medium storing computer-executable instructions that when executed by a processor perform operations comprising:

generating a color palette corresponding to a color image having associated color image metadata;

determining one or more color names corresponding to the color palette based at least in part on color name popularity information; and updating the color image metadata based, at least in part, on a comparison of the one or more determined color names and the color image metadata and based, at least in part, on a comparison of color name metadata associated with the color name popularity information and the color image metadata associated with the color image, wherein the comparison does not include a comparison of color names.

15. The non-transitory computer-readable storage medium of claim 14, wherein the color name popularity information is obtained from a color name survey.

16. The non-transitory computer-readable storage medium of claim 15, wherein the color name survey includes the color name metadata, wherein the color name metadata is associated with individual color names in the color name survey, and wherein the color name metadata includes at least one of a calendar date, a season, or a geographic location of a user voting on popularity of a color name.

17. The non-transitory computer-readable storage medium of claim 14, wherein the color palette is associated with color palette metadata.

18. The non-transitory computer-readable storage medium of claim 17, the operations further comprising updating the color palette metadata based at least in part on a comparison of the one or more determined color names and the color palette metadata.

19. The non-transitory computer-readable storage medium of claim 14, the operations further comprising deleting a color name included in the color image metadata if a color name included in the color image metadata does not correspond to the one or more determined color names corresponding to the color palette.

20. The non-transitory computer-readable storage medium of claim 14, the operations further comprising storing a mismatch indication in the color image metadata if a color name included in the color image metadata does not correspond to the one or more determined color names corresponding to the color palette.

* * * * *